US012640951B2

(12) United States Patent
    Hodzic et al.

(10) Patent No.: US 12,640,951 B2
(45) Date of Patent: May 26, 2026

(54) SEAMLESS CUSTOMER DATA MOVE BETWEEN SOURCE AND TARGET CHARGING FUNCTION ELEMENTS OF A COMMUNICATIONS SYSTEM

(71) Applicant: Telefonaktiebolaget LM Ericsson (publ), Stockholm (SE)

(72) Inventors: Armin Hodzic, Lyckeby (SE); Michael Nilsson, Lyckeby (SE); Martin Fransson, Nättraby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 789 days.

(21) Appl. No.: 17/926,579

(22) PCT Filed: May 20, 2020

(86) PCT No.: PCT/SE2020/050524
    § 371 (c)(1),
    (2) Date: Nov. 19, 2022

(87) PCT Pub. No.: WO2021/235987
    PCT Pub. Date: Nov. 25, 2021

(65) Prior Publication Data
    US 2023/0188369 A1      Jun. 15, 2023

(51) Int. Cl.
    H04L 12/14          (2024.01)

(52) U.S. Cl.
    CPC ...... H04L 12/1403 (2013.01); H04L 12/1442 (2013.01)

(58) Field of Classification Search
    CPC . H04L 12/1403; H04L 12/1442; H04L 12/14; G06F 3/0617; G06F 3/0605;
    (Continued)

(56) References Cited

U.S. PATENT DOCUMENTS

| | | | | |
|---|---|---|---|---|
| 2009/0170469 A1* | 7/2009 | Tuli | ...................... | H04M 15/00 |
| | | | | 455/406 |
| 2011/0143782 A1* | 6/2011 | Dowlatkhah | ........... | H04W 4/00 |
| | | | | 455/456.5 |
| 2018/0367322 A1* | 12/2018 | Watanabe | ............. | H04W 92/20 |

FOREIGN PATENT DOCUMENTS

| | | | | |
|---|---|---|---|---|
| EP | 3425939 A1 | 1/2019 | | |
| EP | 3448007 A1 * | 2/2019 | ............. | H04W 4/24 |

OTHER PUBLICATIONS

Wang Zhi; Cai Yigang: "Management Optimization of Mobile Edge Computing (MEC) in 5G Networks", 2019 IEEE International Conference on Communications Workshops (ICC Workshops), IEEE, May 20, 2019, pp. 1-6, XP033575316. (Year: 2019).*

(Continued)

*Primary Examiner* — Yuwen Pan
*Assistant Examiner* — Swati Jain
(74) *Attorney, Agent, or Firm* — Sage Patent Group

(57)          ABSTRACT
A charging system includes a source charging function element of a communications system. The source charging function element includes at least one processing circuit that is operative to process charge events for network charging related to a customer identifier to write customer data indicating the network charging into a source data partition of a global storage system. Based on receiving an event message, the source charging function element determines the customer identifier based on content of the event message and performs a look up in a translation function to obtain a mapping between the customer identifier and at least data partition that includes the source data partition. When the customer identifier is determined to be mapped by the translation function to the source data partition and to a target data partition, the source charging function element communicates with a target charging function element.

20 Claims, 6 Drawing Sheets

(58) Field of Classification Search
CPC ...... G06F 3/0653; G06F 3/0647; G06F 3/067;
H04M 15/31; H04M 15/64; H04M 15/70;
H04M 15/8033; H04M 15/00; H04M
15/74; H04W 4/24
See application file for complete search history.

(56) References Cited

OTHER PUBLICATIONS

"Multi-access Edge Computing (MEC); Application Mobility Service API", ETSI Group Specification, European Telecommunications Standards Institute (ETSI), vol. MEC, No. V2.1.1, Jan. 21, 2020 (Jan. 21, 2020), pp. 1-47, XP014360238 (Year: 2020).*

Extended European Search Report, European Patent Application No. 20936129.4, mailed Jun. 12, 2023, 10 pages.

International Search Report and Written Opinion of the International Searching Authority, PCT/SE2020/050524, mailed Apr. 16, 2021, 11 pages.

Wang, Z., et al., "Management Optimization of Mobile Edge Computing (MEC) in 5G Networks," 2019 IEEE International Conference on Communications Workshops (ICC Workshops) May 20-24, 2019, Shanghai, China, 6 pages.

"Multi-access Edge Computing (MEC); Application Mobility Service AP," ETSI GS MEC 021 V2.1.1, ETSI Group Specification, Jan. 21, 2020 (XP014360238) 47 pages.

* cited by examiner

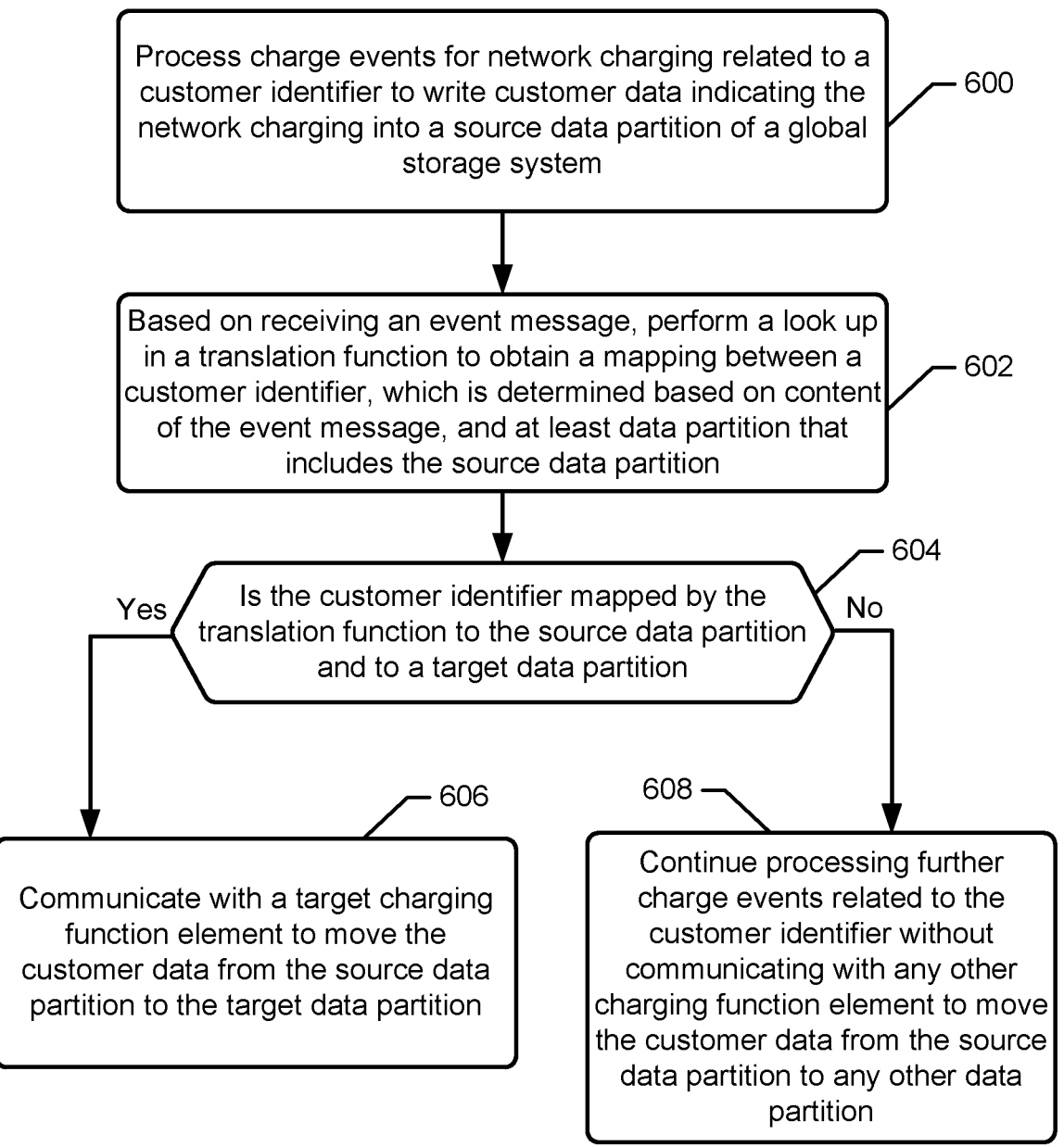

Process charge events for network charging related to a customer identifier to write customer data indicating the network charging into a source data partition of a global storage system — 600

Based on receiving an event message, perform a look up in a translation function to obtain a mapping between a customer identifier, which is determined based on content of the event message, and at least data partition that includes the source data partition — 602

— 604
Is the customer identifier mapped by the translation function to the source data partition and to a target data partition Yes          No — 606
Communicate with a target charging function element to move the customer data from the source data partition to the target data partition 608 —
Continue processing further charge events related to the customer identifier without communicating with any other charging function element to move the customer data from the source data partition to any other data partition

FIGURE 6

SEAMLESS CUSTOMER DATA MOVE BETWEEN SOURCE AND TARGET CHARGING FUNCTION ELEMENTS OF A COMMUNICATIONS SYSTEM

CROSS REFERENCE TO RELATED APPLICATIONS

This application is a 35 U.S.C. § 371 national stage application of PCT International Application No. PCT/SE2020/050524 filed on May 20, 2020, the disclosure and content of which is incorporated by reference herein in its entirety.

TECHNICAL FIELD

The present disclosure relates to communications systems and, more particularly, to processing charge events for network charging related to communications system resource utilization for customer communications.

BACKGROUND

Low communication latency is a very important factor for an operator to use their communications network as efficient as possible. Special attention to the design of the system is needed for distributed systems in a multi-site deployment.

A communications operator's network is normally divided into geographically distributed sites which are optimized for redundancy, latency and transmission usage. An individual customer's data can only be stored or active in one site at a time in order to avoid customer information inconsistency and resulting ambiguities which can be called a split-brain syndrome. When using a distributed network node architecture, the customer data should be stored and processed as close to the customer's geographic location as possible. Customers are generally moving around in a limited geographic area but can permanently, or for extended periods of time, move to completely different geographic locations.

For an operator to continuously optimize network efficiency, the customer data should be movable within the distributed system. Such movements may be triggered by a customer's geographical movement, by when the operator's network is expanded with new sites or data centers, and by when the operator need to redistribute customers between sites to adjust network utilization (e.g., network node processing utilization).

The operational challenge is to be able to perform movements of customer data without interfering with service availability for the customer or causing financial loss for the operator. To avoid disturbances in the network service usage flow, handover of an ongoing session should be coordinated between the usage executing nodes of the network. There should be only one executing node that processes charging events for a particular customer while services are being provided, even when the customer is being provided concurrent communication sessions.

Moving customer data between two network nodes which are located at distributed geographical locations and are each operating to be responsible for managing the customer data, can be error prone. Operations should not attempt to update customer data concurrently in the two network nodes in order to avoid data inconsistency associated with the split brain symptom. In previously existing systems this is usually managed via manual processes and data locks. An example use of data locks includes, while a customer's data is being moved, all chargeable services for that subscriber are locked until the data move has been completed. Consequently, the subscriber is denied access to services during the finite time while the data is being moved. Such service downtime can be perceived by the customer as a system error or otherwise be perceived negatively. Due to these and other concerns, customer data moves are usually postponed longer than necessary, which is not optimal for network efficiency, and are also normally done in large batches during nightly maintenance windows. This in turn drives additional costs for the operator due to the need for additional staff during the maintenance window to perform the customer data move and to verify that the data that has been moved is consistent and correct.

SUMMARY

Some embodiments of the present disclosure are directed to a charging system that includes a source charging function element of a communications system. The source charging function element includes at least one processing circuit that is operative to process charge events for network charging related to a customer identifier to write customer data indicating the network charging into a source data partition of a global storage system. Based on receiving an event message, the source charging function element determines the customer identifier based on content of the event message and performs a look up in a translation function to obtain a mapping between the customer identifier and at least data partition that includes the source data partition. When the customer identifier is determined to be mapped by the translation function to the source data partition and to a target data partition, the source charging function element communicates with a target charging function element to move the customer data from the source data partition to the target data partition.

Some other related embodiments are directed to a method by a source charging function element of a communications system. The method includes processing charge events for network charging related to a customer identifier to write customer data indicating the network charging into a source data partition of a global storage system. Based on receiving an event message, the method performs a look up in a translation function to obtain a mapping between a customer identifier, which is determined based on content of the event message, and at least data partition that includes the source data partition. When the customer identifier is determined to be mapped by the translation function to the source data partition and to a target data partition, the method communicates with a target charging function element to move the customer data from the source data partition to the target data partition.

Potential advantages of these and other embodiments disclosed herein include that the customer data can be geographically moved between data partitions during ongoing customer services in a seamless manner without interruption. In particular, the data move can be performed during live subscriber service traffic with ongoing tracking of charging related to the subscribers' data which is being moved. Movement of customer data can be driven by the customers' network interrogations and can be orchestrated via a separate service so that the movement process is controlled and state is kept in the existing state model. Movement of the customer data may be triggered by an external client, where the trigger is processed in the customer move service. The customer move service may orchestrate the move by calling specific services of network nodes that are involved in processing network events. In some embodiments, once all of the specific services of the network nodes have reported completion of their portion of the move, the customer move service will change the state of the process to be fully completed.

It is noted that aspects described with respect to one embodiment may be incorporated in different embodiments although not specifically described relative thereto. That is, all embodiments and/or features of any embodiments can be combined in any way and/or combination. Moreover, other charging systems and corresponding methods according to embodiments will be or become apparent to one with skill in the art upon review of the following drawings and detailed description. It is intended that all such other charging systems and corresponding methods be included within this description and protected by the accompanying claims.

BRIEF DESCRIPTION OF THE DRAWINGS

Aspects of the present disclosure are illustrated by way of example and are not limited by the accompanying drawings. In the drawings:

FIG. 6 is a flowchart of operations by a source charging function element in accordance with some embodiments of the present disclosure.

DETAILED DESCRIPTION

Figure 1:
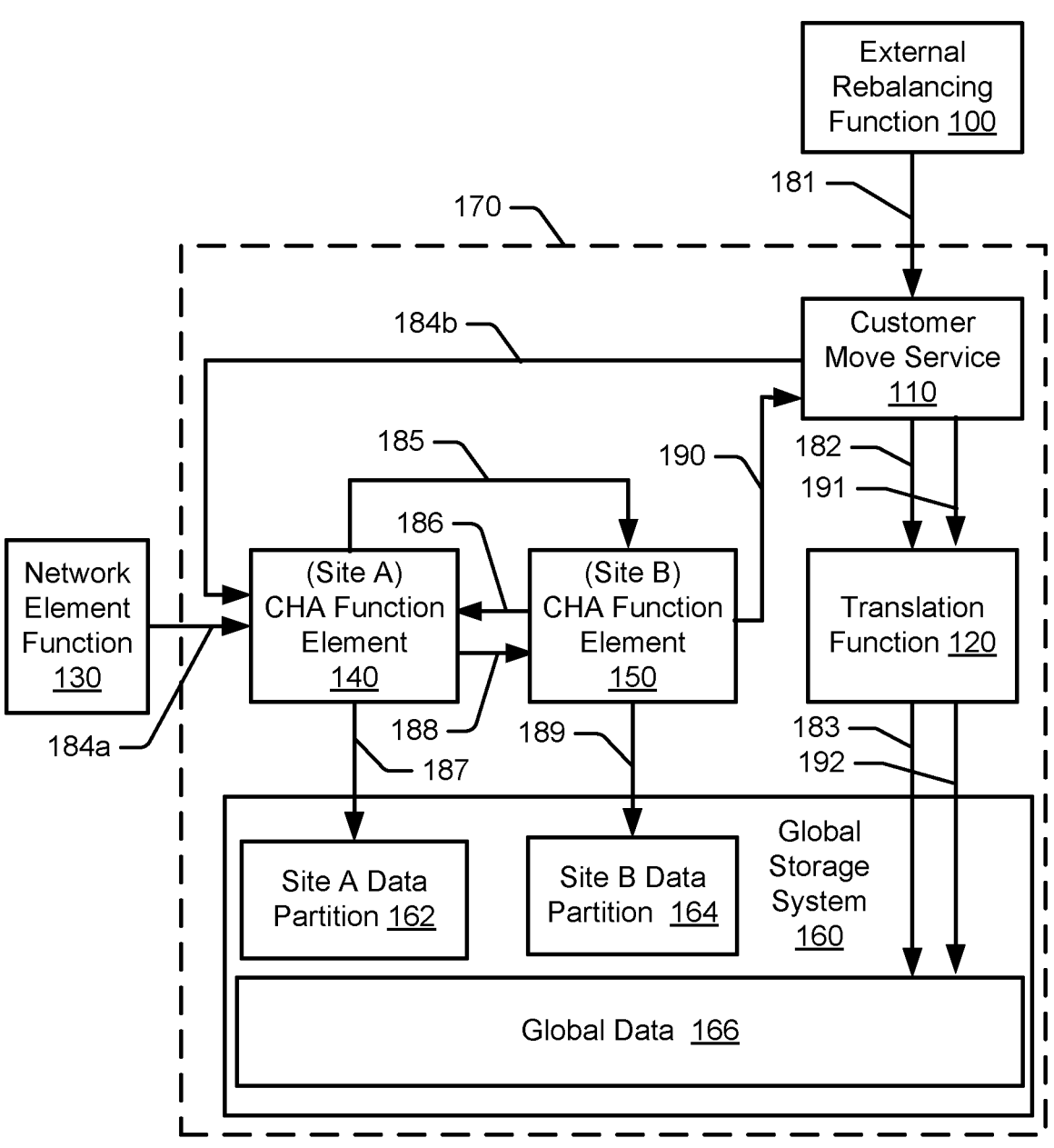
FIG. 1 illustrates network nodes of a communications system and some communication pathways therebetween during operations to move customer data between data partitions in accordance with some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

As explained above, with previously existing systems it can be error prone to attempt to move customer data between two network nodes which are located at distributed geographical locations and are each operating to be responsible for managing the customer data. Operations should not attempt to update customer data concurrently in the two network nodes in order to avoid data inconsistency associated with the split brain symptom.

Various embodiments of the present disclosure are directed to performing the handover of ongoing sessions in a coordinated manner between the source and target network nodes that are managing the customer data. Customer data can be geographically moved between data partitions during ongoing customer services in a seamless manner without interruption. Movement of customer data can be driven by the customers' network interrogations and can be orchestrated via a separate service so that the movement process is controlled and state is kept in the existing state model. Movement of the customer data may be triggered by an external client, where the trigger is processed in the customer move service. The customer move service may orchestrate the move by calling specific services of network nodes that are involved in processing network events. In some embodiments, once all of the specific services of the network nodes have reported completion of their portion of the move, the customer move service will change the state of the process to be fully completed.

The operations for moving customer data can be optimized to enable access to the customer data to be provided at any given point in time. Reasons for initiating movement of a customer's data between data partitions can include a need to distribute the load of a certain customer, e.g. large customer with many consumers or moving of a single customer to another site, and/or to decrease the response times from an Online Charging System (OCS) system. One of the potential advantages by one or more embodiments herein is to decrease the overall response time from the system such as by moving customer data to a site that is close to the customer's physical location. Another potential advantage is that the move is included in the processing behavior of the charging component, where the additional signaling need for the move is just a fraction of the event latency.

Various embodiments disclosed herein can be based on one or more of the following fundamental principles. First, one or several data sources that are controlled by data master applications that control the different aspects of customer data, e.g., installed base, balances, invoices, history etc. This can be one master application controlling all the data or multiple applications with separated persistent storages. Second, each data partition is assigned a unique routing id (a partition is a group of customers and related data that has been assigned to a specific logical partition). Third, each data partition can be assigned to a specific location (for instance site or data center). Fourth, a translation function is provided that translates between a public/external id to an internal id including partition id. Fifth, the id used by the translation function can be MSISDN, IMSI, SIP-URI, or any other identifier that is known by the user or the user's client. Lastly, an orchestration function is provided that controls the flow of physically moving the customer data.

Some embodiments are initially described in the context of a first example scenario in which a customer data move is performed when no usage consumption is active.

According to this first example, the customer data move is forced, i.e. when circumstances prevent the customers from indirectly moving their data via a usage event. This situation can occur if a customer move has been ordered but the customer has not triggered any usage events or if an urgent move of customer(s) is required.

An external system will trigger a customer move service to order the customer data move. This external system can be a customer management system where an authorized user can manually trigger the customer move service or an automated system that can detect that certain criteria has been fulfilled to trigger a customer move, e.g. an analytics system or other decision system (e.g., an artificial intelligence (AI) system).

The orchestration function has in this example a basic flow of:

1. Updating the translation function to indicate that the customer data shall be moved from a source data partition to a target data partition.

2. Trigger the data master application(s) to move customer data from the source data partition to the target data partition and orchestrate/monitor that each data master application has reported a successful data move.

3. Update the translation function that the customer data move has been completed.

4. Clean-up customer data in the old source data partition.

Each of these steps are described in more detail below.

The first step of the customer move service is to update the translation mechanism that keep track of which logical data partition contains the customer data. After the update the translation function contains a mapping that associates the current source data partition and the new target data partition to which the customer data will be moved.

The second step starts the actual customer data move from the source data partition to the target data partition. The customer move service triggers a sequential or parallel movement of the customer data by data master applications which manage storage and movement of the customer data at the source data partition, network nodes along a data movement route to the target data partition, and at the target data partition. The respective data master applications trigger the handover from the source data partition and, once the customer data is drained on the source data partition, read the customer data from the source data partition and write it to the target data partition. Each data master application then reports back to the customer move service that the customer data has been moved successfully to the target data partition.

In step three, the customer move service performs an update of the translation function to indicate that all of the customer data has been moved to the target data partition. The update sets the target data partition as a primary where the customer data has been moved to. The source data partition information is removed from the translation function, the absence of which indicates to clients of the translation function that no data move is in progress for this customer. All future requests for the customer's data will be routed to the target data partition.

In step four, the customer move service triggers a clean-up of the customer data in the former source data partition. This is a housekeeping task to avoid orphaned customer data in the system.

Some additional or alternative embodiments are now described in the context of a second example scenario in which a customer data move is performed when usage consumption is active. This example illustrates the more commonly occurring operation of customer data move. In a live system it can be impossible for the communications system to know exactly when a customer will use the services offered by the communications system. In this example the customer data move is performed during active usage of the customer data in the database stored in a global storage system. The customer data move is implicitly triggered by customer activities. The procedure allows a seamless experience for the end customer as well as for the communications system, i.e., no down-time, data loss or rejected requests will be experienced. The main difference compared to the prior first example is that parts of the dynamic customer data used in a usage scenario is moved when the usage event is received and not triggered directly from the customer move service.

An external system will trigger the customer move service to order the customer data move. This external system can be a customer management system where an authorized user can manually trigger the customer move service or an automated system that can detect that certain criteria have been fulfilled to trigger a customer data move, e.g., an analytics or AI system.

The customer data move service has in this example a basic flow of:

1. Update the translation function to indicate that the customer data should be moved.

2. Copying static or semi-static customer data from a source data partition to a target data partition responsive to one or more defined events such as receipt of a usage event or an instruction to trigger the dynamic data move.

3. Wait for triggers from one or several data master applications that the customer data has been successfully moved.

4. Update the translation function that the customer data moves have been completed.

5. Clean-up customer data in the old source data partition.

Each of these steps are described in more detail below.

In step one the orchestrator function updates the translation function to indicate that the customer data should be moved to a new partition (called target data partition). After the update the translation function will map the source data partition as the primary and the target data partition as the secondary.

In step two the orchestrator function triggers the move of static and semi-static customer data from the source data partition to the target data partition. Dynamic data can include balance information, session data, and other data which can change rapidly. The static data can include product data, such when a customer buys a product service type (e.g., tiered monthly data service plan), and customer information (e.g., contact information), etc. This is performed by one or more data master application(s) (which can be part of the customer move service) as a read from the source data partition and a copy to the target data partition. The data master application will then write any new updates to the customer data in the target data partition following the routing indicated in the translation function.

In step three the customer move service is passive until a trigger is received from the data master application(s) that the customer data has been moved to the target data partition. The data master application(s) will upon receipt of a usage event, triggered for instance by a customer using a user equipment for a data session, trigger the following sub flow:

1. Lookup in the translation function to find where the usage event should be routed. In this case a "customer data move" is indicated since the translation function returns both an address of a source data partition and a target data partition. The usage event is then routed to the data master application instance serving the target data partition (new partition).

2. The data master application instance then processes the usage event on the target data partition and tries to read the dynamic customer data from the target data partition. This will return a "data not found" error since the dynamic customer data has not yet been moved to the target data partition. This is an indication to the data master application instance that the customer data has not yet been moved, and that the customer data move needs to be performed before the usage event can be processed and a response sent back to the client.

3. The data master application instance managing data on the target data partition initiates handover of the customer data from the source data partition to the target data partition to prevent any further updates of the customer data on the source data partition. This will not affect any user or system activities related to the customer data as the move will be done within the flow of the processing event. The customer data is then be read from the source data partition, processed and persisted as a new state in the target data partition.

4. The data master application instance will then notify the customer move serve that the customer data move is complete.

In step four, the customer move service triggers an update to the translation function to indicate that the customer data move has been completed. After the update, the data in the translation function will indicate the target data partition as primary and the source data partition will be empty. Absence of an indication of the source data partition in the translation function serves to signify to all clients in the system that there is no longer any data move in progress for the customer and that normal routing as per the data returned from the translation function (primary data partition formerly called target data partition) shall be used.

As a subsequent activity in step four, the customer move service triggers a clean-up of the customer data in the former source data partition. This is a housekeeping task to avoid orphaned customer data in the system.

These and other related operations are now described in further detail with regard to FIGS. 1-4.

An online charging system (OCS) handles charging data, e.g., SMS, traffic charting, etc., in a distributed charging system. Subscribers are grouped to subscriber partitions. For example subscribers living in Stockholm are grouped in partition A to optimize access to the associated customer information. In the case a subscriber moves from one city to another or when the topology of the network is redefined. There can be a need to move a subscriber from one partition to another or from one site to another.

In existing systems, while a subscriber's data is being moved all chargeable services for that subscriber are locked until the data move has been completed. Consequently, the subscriber is denied access to services during the finite time while the data is be moved. Such service downtime can be perceived by the as a system error or otherwise be perceived negatively.

A potential advantage of embodiments herein is that the operations allow the subscriber's data to be moved while enabling chargeable services to continue to be provided to the subscriber. In particular, the data move can be performed during live subscriber service traffic with ongoing tracking of charging related to the subscribers' data which is being moved. The move can be initiated by a customer event, e.g., SMS, or external trigger by an external system that asked for or triggers the move.

Figure 2:
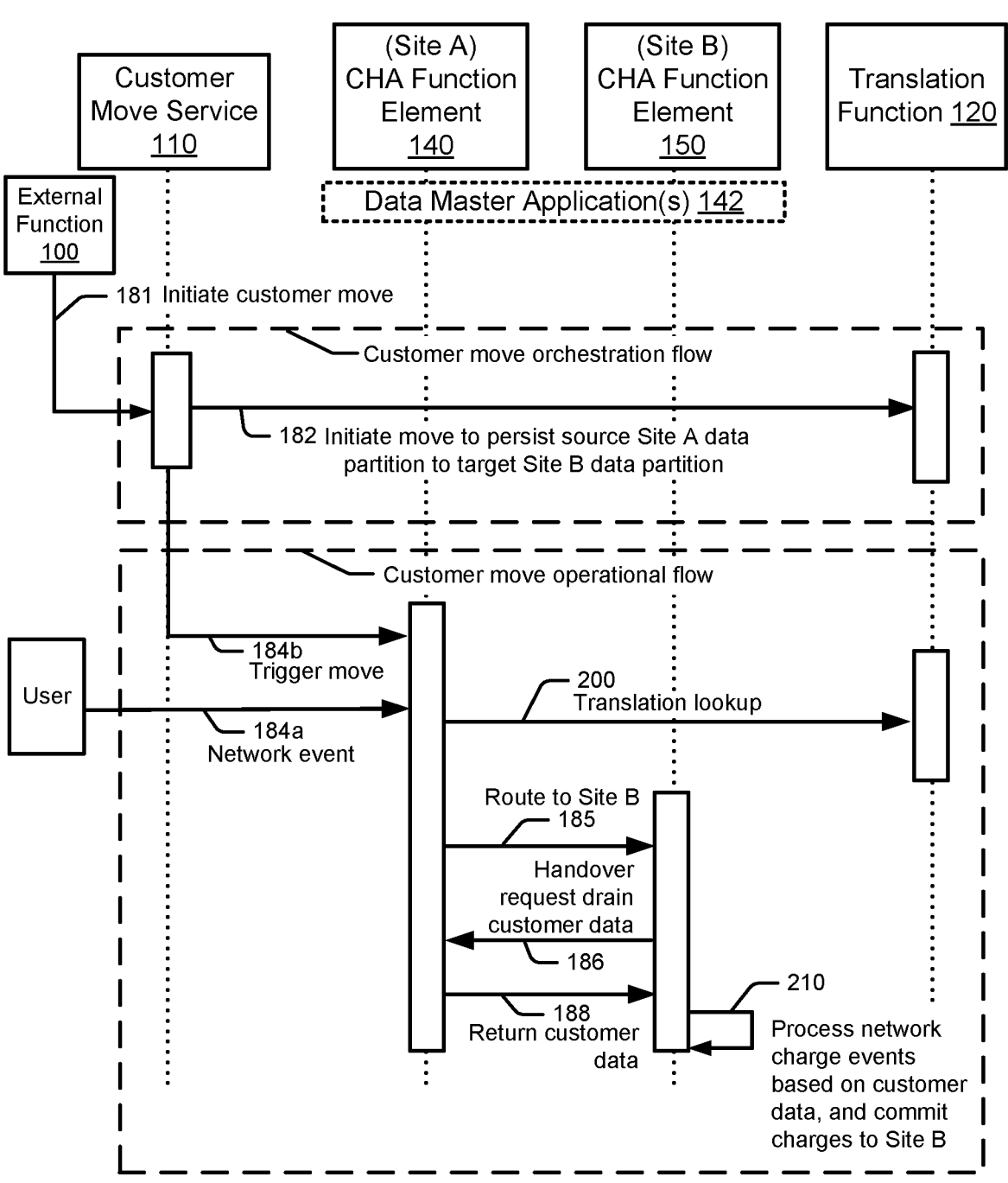
FIG. 2 illustrates a corresponding data flow diagram showing various communications between the network nodes of FIG. 1 to perform movement of customer data between data partitions in accordance with some embodiments.

Embodiments of network nodes and associated operations that can be performed to move customer data between data partitions in global data of a global storage system, are now explained in the context of FIGS. 1 and 2. FIG. 1 illustrates network nodes of a communications system and some communication pathways therebetween during operations to move customer data between data partitions in accordance with some embodiments. FIG. 2 illustrates a corresponding data flow diagram showing various communications between the network nodes of FIG. 1 to perform movement of customer data between data partitions in accordance with some embodiments.

The operational communication flows shown in FIGS. 1 and 2 are directed to a scenario in which customer data is moved from a source data partition to target data partition, and where a functional element that manages customer data storage in the target data partition becomes responsible for managing the customer data movement to ensure data consistency.

Referring to FIG. 1, the communications system includes an external rebalancing function 100, a network element function 130, a Site A charging (CHA) function element 140, a Site B charging function element 150, a customer move service 110, a translation function 120, and a global storage system 160 containing global data 166. The Site A charging (CHA) function element 140 is initially responsible for storing charging information associated with the customer into the Site A data partition 162. In the scenario of FIGS. 1 and 2, the system needs to move the customer data from the Site A data partition 162 (also called source data partition) to the Site B data partition 164 (also called target data partition). Handoff of responsibility for logging (e.g., storing log entries) customer charging is made from the Site A charging function element 140 to the Site B charging function element 150, after which the Site B charging function element 150 becomes responsible for logging charging information associated with the customer into the Site B data partition 164 (target data partition).

The external rebalancing function 100 can be any back office equipment, such as customer relations manager (CRM) system or any back office customer management tool. The charging function elements 140 and 150, the customer move service 110, the translation function 120, and the global storage element 160 form a charging system 170 for a communications system, and which may be part of an online charging system (OCS), such as a 4G OCS. The customer move service may be part of a CRM node, such as a 4G CRM node. The Site A charging function element 140 and the Site B charging function element 150 may each be part of a 5G Charging Function (CHF). The global storage system 160 can be a distributed networked memory system, such as geographically dispersed and networked data servers which store the global data 166 tracking customer charging for utilizing resources, e.g., hardware and/or software services, of the communications systems.

The external rebalancing function 100 communicates to the customer move service 110 a move request 181 for a customer identifier which indicates that movement of the customer's data needs to occur. The customer move service 110 is operative to move all global data associated with a customer. Responsive to receiving the move request 181, the customer move service 110 communicates a global data move instruction 182 to a translation function 120 indicating the pending movement of the identified customer data with the global data 166. The translation function 120 maintains a mapping of all customers, who are subscribers or other communication resource users in the communications system, to where the data for each of those customers is stored in a respective one of a plurality of partitions in the global data repository 166 of the global storage system 160, e.g., a distributed network memory system such as geographically dispersed network data servers. The translation function 120 may also maintain a mapping between customer identifiers, such as a mapping between a customer and a plurality of customer identifiers which have been assigned to that customer.

In the example of FIGS. 1 and 2, the identified customer data is initially stored in the Site A data partition 162 of the global data 166. The translation function 120 initially maintains a mapping of the identified customer data to the Site A data partition 162. Response to receipt of the global data move instruction 182 indicating planned movement of the identified customer data, the translation function 120 assigns a further mapping of Site A data partition 162 (now a source data partition) to a new Site B data partition 164 (now a target data partition) where the identified customer data will be moved. The translation function 120 also responsively communicates 183 to the global storage system 160 the assignment of the Site B data partition 164 (target data partition) in the global data 166 for future storage of the identified customer data which will be moved from the Site A data partition 162.

Operations to perform movement of the customer data from the Site A data partition 162 (source data partition) to the Site B data partition 164 (target data partition) can be initiated responsive to either of two different scenario events: 1) a network element function 130 communicating 184*a* a charge event (also called "event message") to a Site A charging function element 140 indicating charging for the identified customer; or 2) the customer move service 110 communicating 184*b* a customer move event (which is also referred to as an "event message") to the Site A charging function element 140 to initiate the operations to move the identified customer data. Either of these two scenario events (event messages) causes movement of the identified customer data to be presently performed from the Site A data partition 162 (source data partition) to the Site B data partition 164 (target data partition).

Responsive to receipt of one of these events, the Site A charging function element 140 performs a lookup 200 in the translation function 120 to determine where the event should be routed for recording into a data partition. Because a customer data move has been initiated by instruction 182 and the translation function 120 has created a corresponding mapping between where the customer data will be moved from and where the customer data will be moved to, a "customer data move" is indicated by the translation function 120 returning to the Site A charging function element 140 both an address of the Site A data partition 162 (source data partition) and an address of the Site B data partition 164 (target data partition). The Site A charging function element 140 responsively routes the event to the Site B charging function element 150 (or a data master application 142 manages data access to data partition(s) for the Site B charging function element 150), where the Site B charging function element 150 accesses the Site B data partition 164 (target data partition).

The Site B charging function element 150 (or a data master application 142 which manages data access to data partition(s)) then processes the event and tries to read part of the customer data (dynamic customer data) from the Site B data partition 164 (target data partition). This will return a "data not found" error indication since the (dynamic) customer data has not yet been moved to the Site B data partition 164 (target data partition). This is an indication to the Site B charging function element 150 that the customer data has not yet been moved, and that the customer data move needs to be performed before the event can be processed and a response sent back to the client (e.g., the network element function 130 shown in FIG. 1 which can correspond to the user equipment or the external function 100 shown in FIG. 2).

The Site B charging function element 150 (or a data master application 142) communicates to the Site A charging function element 140 a handover request message 186 requesting movement of the customer data from the Site A data partition 162 (source data partition) while preventing any further update by the Site A charging function element 140 of the customer data on the Site A data partition 162 (source data partition) based on any subsequently received charging event. These operations may not affect any user or system activities related to the customer data because the move will be done within the flow of the processing of the charge event.

The Site A charging function element 140 responsively closes customer charging for all ongoing sessions or other network resource utilization associated with the customer (including by completing all pending charge events), and hands over responsibility for charging related to those ongoing sessions to the Site B charging function element 150. As part of the closing of charging for the customer, the Site A charging function element 140 drains 187 (processes) any pending charge events (e.g., intermediate charge events) for the ongoing sessions and records resulting charges (e.g., charging units) to Site A data partition 162, and then reads the customer data from the Site A data partition 162 (source data partition) and sends 188 the customer data (e.g., ongoing session information and other present customer charging state information) to the Site B charging function element 150 for storage in the Site B data partition 164 (target data partition). The Site B charging function element 150 takes over responsibility for processing incoming charge events and recording 189 charges (e.g., charge events) to the Site B data partition 164.

In one embodiment, before the draining 187 and sending 188 operations are completed, the Site A charging function element 140 will continue to receive any subsequent charge event(s) related to the customer (since the translation function 120 still shows the customer is primarily served by the Site A charging function element 140), and will forward those subsequent charge event(s) to the Site B charging function element 150 for processing and recording to the Site B data partition 164.

When the writing of the customer data to the Site B data partition 164 (target data partition) has been completed, the Site B charging function element 150 (or a data master application 142) then notifies 190 the customer move service 110 that the customer data move is complete. The customer move service 110 triggers 191 an update to the translation function 120 to indicate that the customer data move has been completed. After the update, the data in the translation function 120 will indicate the address of the Site B data partition 164 (target data partition) is primary mapped to the identified customer data and the address of the Site A data partition 162 (source data partition) will be empty or removed from any mapping to the identified customer data. Absence of an indication of the Site A data partition 162 (source data partition) in the translation function 120 serves: to indicate to all clients in the system that there is no longer any data move in progress for the customer data; and to further indicate that normal charge event routing is to be performed using the translation lookup data returned from the translation function 120 now indicates that the Site B data partition 164 (formerly target data partition) shall be used for charging related to the identified customer. The network element function 130 begins routing charge events related to the customer directly to the Site B charging function element 150 instead of Site A charging function element 140 through a process of querying an access function (which may reside in each of the charging function elements) which uses the mapping information in the translation function 120 to determine which charging function element is responsible for handling charging related to the customer.

In one embodiment, the translation function 120 triggers 192 the global storage system 160 to deallocate global data storage in the Site A data partition 162 for the customer data.

In other embodiment, responsive to being informed that the customer data move to the Site B data partition 164 has been successfully completed, the customer move service 110 can instruct the Site A charging function element 140 (or a data master application 142) to delete the customer data from the Site A data partition 162 (formerly source data partition).

Future charge events associated with the customer are thereby routed by the translation function 120 to the Site B charging function element 150 for processing 210 and committing (recording) charges to the Site B data partition 164.

In FIGS. 1 and 2, although various arrows are used to convey example communication directions between the system elements, the illustrated arrows are not limiting and the communications can occur in the opposite directions to those illustrated and often occur in both directions. Moreover, the communications can occur through intermediary elements other than those shown. Other communications between the illustrated system elements occur, although associated arrows have not been illustrated to simplify the drawing.

Some other embodiments are directed to moving customer data under the control of the source charging function element (or the associated data master application) that is managing the customer data stored on a currently used data partition, i.e., the source data partition. These embodiments are illustrated in FIGS. 3 and 4, which are in contrast to the operations of FIGS. 1 and 2 where control of the movement of the customer data was the responsibility of the target charging function element (or the associated data master application).

Figure 3:
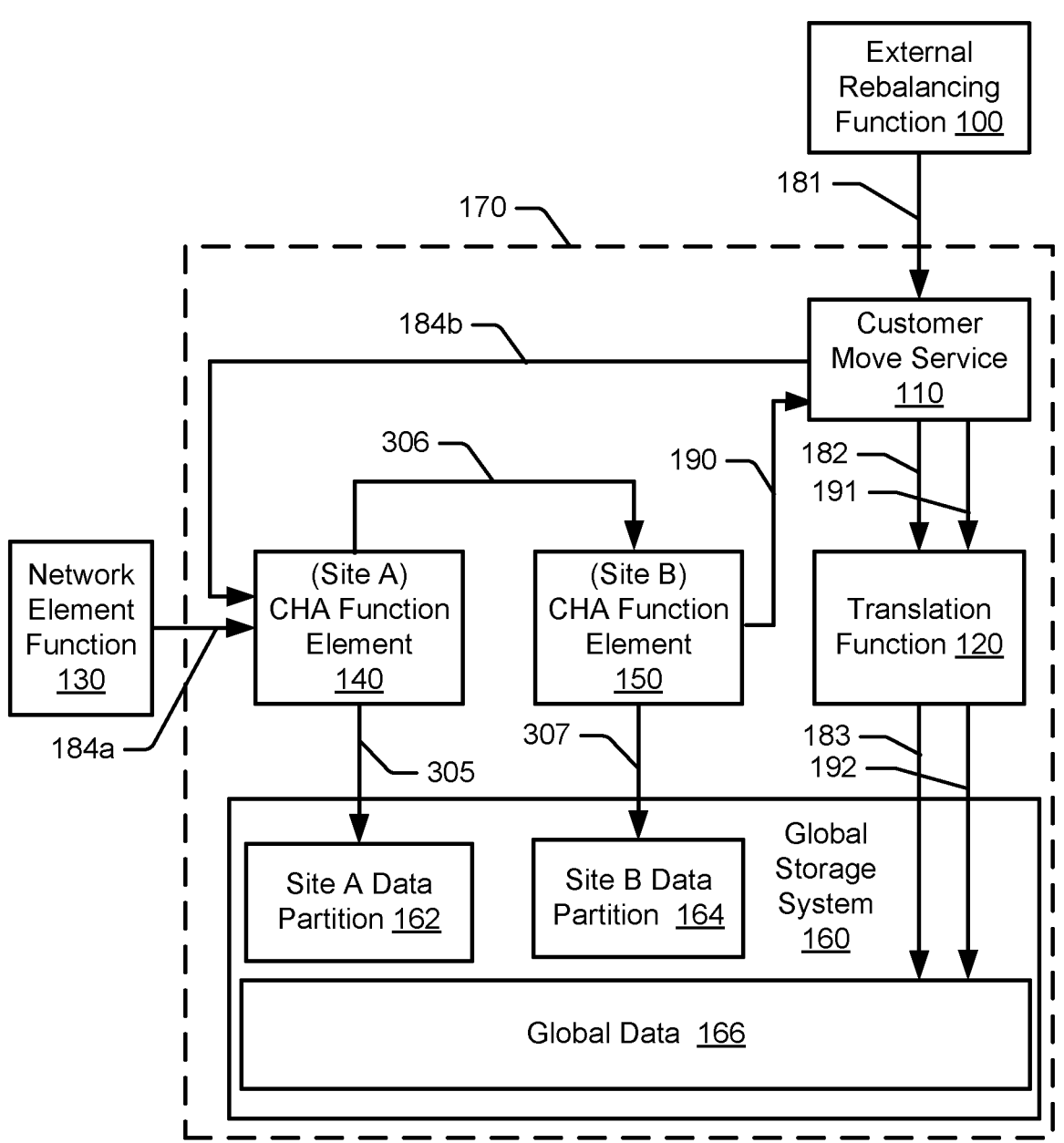
FIG. 3 illustrates network nodes of a communications system and some communication pathways therebetween during operations to move customer data between data partitions under the control of the source charging function element.
Figure 4:
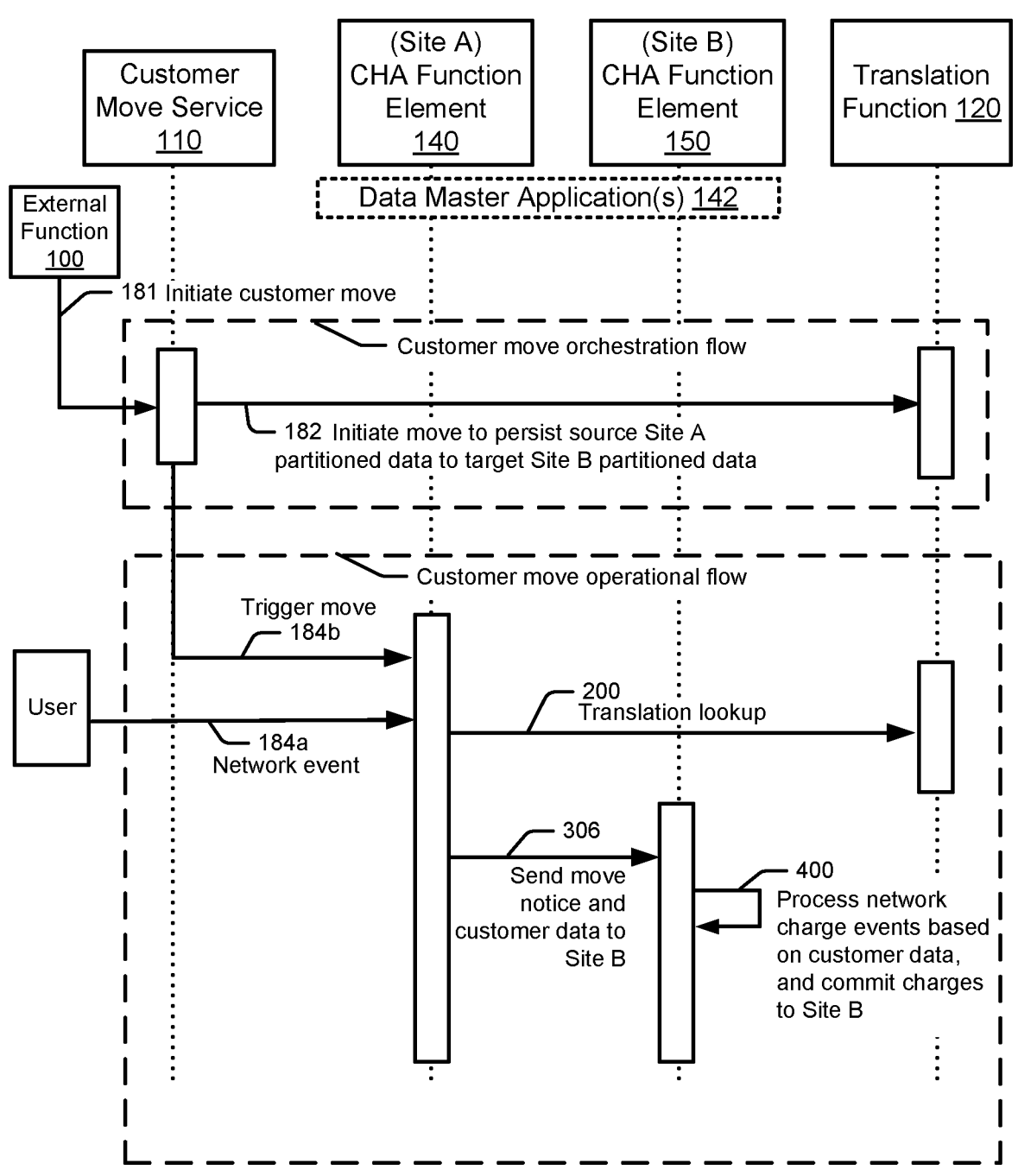
FIG. 4 illustrates a corresponding data flow diagram showing various communications between the network nodes of FIG. 3 to perform movement of customer data between data partitions in accordance with some embodiments.

FIG. 3 illustrates network nodes of a communications system and some communication pathways therebetween during operations to move customer data between data partitions under the control of the source charging function element. FIG. 4 illustrates a corresponding data flow diagram showing various communications between the network nodes of FIG. 3 to perform movement of customer data between data partitions in accordance with some embodiments.

Referring to FIG. 3, the communications system includes the external rebalancing function 100, the network element function 130, the Site A charging (CHA) function element 140, the Site B charging (CHA) function element 150, the customer move service 110, the translation function 120, and the global storage system 160 containing global data 166. The Site A charging function element 140 is initially responsible for storing charging information associated with the customer into the Site A data partition 162. In the scenario of FIGS. 3 and 4, the system needs to move the customer data from the Site A data partition 162 (also called source data partition) to the Site B data partition 164 (also called target data partition). In the scenario of FIGS. 3 and 4, the responsibility for logging (storing) customer charging is handed off from the Site A charging function element 140 to the Site B charging function element 150, after which the Site B charging function element 150 becomes responsible for logging charging information associated with the customer into the Site B data partition 164 (target data partition).

The external rebalancing function 100 communicates to the customer move service 110 a move request 181 for an identified customer which indicates that movement of the customer's data needs to occur. The customer move service 110 is operative to move all global data associated with a customer. Responsive to receiving the move request 181, the customer move service 110 communicates a global data move instruction 182 to the translation function 120 indicating the pending movement of the identified customer data with the global data 166. As explained above, the translation function 120 maintains a mapping of all customers, who are subscribers or other communication resource users in the communications system, to where the data for each of those customers is stored in a respective one of a plurality of partitions in the global data repository 166 of the global storage system 160, e.g., a distributed network memory system such as geographically dispersed network data servers. The translation function 120 may also maintain a mapping between customer identifiers, such as a mapping between a customer and a plurality of customer identifiers which have been assigned to that customer.

In the example of FIGS. 3 and 4, the identified customer data is initially stored in the Site A data partition 162 of the global data 166. The translation function 120 initially maintains a mapping of the identified customer data to the Site A data partition 162. Response to receipt of the global data move instruction 182 indicating planned movement of the identified customer data, the translation function 120 assigns a further mapping of Site A data partition 162 (now a source data partition) to a new Site B data partition 164 (now a target data partition) where the identified customer data will be moved. The translation function 120 also responsively communicates 183 to the global storage system 160 the assignment of the Site B data partition 164 (target data partition) in the global data 166 for future storage of the identified customer data which will be moved from the Site A data partition 162.

Operations to perform movement of the customer data from the Site A data partition 162 (source data partition) to the Site B data partition 164 (target data partition) can be initiated responsive to either of two different scenario events: 1) a network element function 130 communicating 184a a charge event ("event message") to the Site A charging function element 140 indicating charging for the identified customer; or 2) the customer move service 110 communicating 184b a customer move event ("event message") to the Site A charging function element 140 to initiate the operations to move the identified customer data. Either of these two scenario events (event messages) causes movement of the identified customer data to be presently performed from the Site A data partition 162 (source data partition) to the Site B data partition 164 (target data partition).

Responsive to receipt of one of these events, the Site A charging function element 140 performs a lookup 200 in the translation function 120 to determine where the usage event should be routed for recording into a data partition. The lookup 200 may include requesting the translation function 120 to use a provided International Mobile Subscriber Identity (IMSI) or other identification of a customer to look up and respond back with identification (e.g., partition ID) of the source data partition and any target data partition, and may respond with further information relating to the customer (e.g., customer information, charging contract identification and/or information, etc.). Because a customer data move has been initiated by instruction 182 and the translation function 120 has created a corresponding mapping between where the customer data will be moved from and where the customer data will be moved to, a "customer data move" is indicated by the translation function 120 returning to the Site A charging function element 140 both an address of the Site A data partition 162 (source data partition) and an address of the Site B data partition 164 (target data partition).

Responsive to determining that customer data move is occurring, the Site A charging function element 140 drains 305 (processes) any pending charge events for the ongoing sessions and records resulting charges (e.g., charging units) to Site A data partition 162, and then reads the customer data from the Site A data partition 162 (source data partition) and sends 306 to the Site B charging function element 150 a notification of the customer data move operation and the customer data (e.g., ongoing session information and other present customer charging state information) for storage in the Site B data partition 164 (target data partition). The Site B charging function element 150 then begins processing incoming charge events and recording 307 charges (e.g., charge events) to the Site B data partition 164.

When the writing of the customer data to the Site B data partition 164 (target data partition) has been completed, the Site B charging function element 150 (or a data master application 142) then notifies 190 the customer move service 110 that the customer data move is complete. The customer move service 110 triggers 191 an update to the translation function 120 to indicate that the customer data move has been completed. After the update 400, the data in the translation function 120 will indicate the address of the Site B data partition 164 (target data partition) is primary mapped to the identified customer data and the address of the Site A data partition 162 (source data partition) will be empty or removed from any mapping to the identified customer data. Absence of an indication of the Site A data partition 162 (source data partition) in the translation function 120 serves: to indicate to all clients in the system that there is no longer any data move in progress for the customer data; and to further indicate that normal charge event routing is to be performed using the translation lookup data returned from the translation function 120 now indicates that the Site B data partition 164 (formerly target data partition) shall be used for charging related to the identified customer. The network element function 130 begins routing charge events related to the customer directly to the Site B charging function element 150 instead of Site A charging function element 140 through a process of querying an access function (which may reside in each of the charging function elements) which uses the mapping information in the translation function 120 to determine which charging function element is responsible for handling charging related to the customer.

In one embodiment, the translation function 120 triggers 192 deallocation of data storage in the Site A data partition 162 for the customer data.

In another embodiment, responsive to been informed that the customer data move has been completed, the customer move service 110 can instruct the Site A charging function element 140 (or a data master application 142) to delete the customer data from the Site A data partition 162 (formerly source data partition).

Future charge events associated with the customer are thereby routed by the translation function 120 to the Site B charging function element 150 for processing 410 and committing (recording) charges to the Site B data partition 164.

In FIGS. 3 and 4, although various arrows are used to convey example communication directions between the system elements, the illustrated arrows are not limiting and the communications can occur in the opposite directions to those illustrated and often occur in both directions. Moreover, the communications can occur through intermediary elements other than those shown. Other communications between the illustrated system elements occur, although associated arrows have not been illustrated to simplify the drawing.

These and other operations shown in FIGS. 1-4 are now more generally described in the context of FIG. 6 which is a flowchart of operations by a source charging function element in accordance with some embodiments of the present disclosure.

Referring to FIG. 6, a method by a source charging function element 140 of a communications system, includes processing 600 charge events for network charging related to a customer identifier to write customer data indicating the network charging into a source data partition of a global storage system. Based on receiving an event message, the method performs 602 (also 200 in FIGS. 2 and 4) a look up in a translation function to obtain a mapping between a customer identifier, which is determined based on content of the event message, and at least data partition that includes the source data partition. When the customer identifier is determined 604 (also 200 in FIGS. 2 and 4) to be mapped by the translation function to the source data partition and to a target data partition, the method communicates 606 (also 185 and 188 in FIGS. 1 and 2, 306 in FIGS. 3 and 4) with a target charging function element to move the customer data from the source data partition to the target data partition.

In some further embodiments, when the customer identifier is determined 604 (also 200 in FIGS. 2 and 4) to be mapped by the translation function to the source data partition and to the target data partition, and prior to communicating 606 (also 185 and 188 in FIGS. 1 and 2, 306 in FIGS. 3 and 4) with the target charging function element to move the customer data from the source data partition to the target data partition, the method closes (187 in FIG. 1, 305 in FIG. 3) pending charge events for ongoing sessions associated with the customer identifier and handing over responsibility for subsequent charging related to the ongoing sessions to the target charging function element.

In a further embodiment, the method deletes the customer data from the source data partition based on an instruction from a customer move service indicating successful completion of the movement of the customer data to the target data partition.

In a further embodiment, when the customer identifier is determined to be mapped by the translation function to the source data partition and to the target data partition, the method performs (187 in FIG. 1, 305 in FIG. 3) closing of pending charge events for ongoing sessions associated with the customer identifier by adding charges for the pending charge events to the customer data in the source data partition, and upon completion of the closing of the pending charge events the method communicates 606 (188 in FIG. 1, 306 in FIG. 3) the customer data from the source data partition to the target charging function element.

In a further embodiment, when the customer identifier is determined 604 (also 200 in FIGS. 2 and 4) to be mapped by the translation function to only the source data partition and not any other data partition, the method continue processing 608 further charge events related to the customer identifier to write customer data indicating the network charging into the source data partition without communicating with any other charging function element to move the customer data from the source data partition to any other data partition.

More general operations that can be performed by the charging system 170 will now be explained below. The charging system 170 includes a source charging function element 140 of a communications system. The source charging function element 140 includes at least one processing circuit 510 that is operative to: process charge events for network charging related to a customer identifier to write customer data indicating the network charging into a source data partition 162 of a global storage system 160. Based on receiving an event message, the at least one processing circuit 510 determines the customer identifier based on content of the event message and perform a look up in a translation function 120 to obtain a mapping between the customer identifier and at least data partition that includes the source data partition. When the customer identifier is determined to be mapped by the translation function 120 to the source data partition 162 and to a target data partition 164, the at least one processing circuit 510 communicates with a target charging function element 150 to move the customer data from the source data partition 162 to the target data partition 164.

In a further embodiment, the at least one processing circuit 510 of the source charging function element 140 is further operative to, when the customer identifier is determined to be mapped by the translation function 120 to only the source data partition and not any other data partition, continue processing further charge events related to the customer identifier to write customer data indicating the network charging into the source data partition 162 without communicating with any other charging function element to move the customer data from the source data partition 162 to any other data partition.

In a further embodiment, the event message includes a charge event for network charging related to the customer identifier, and the at least one processing circuit 510 of the source charging function element 140 is further operative to respond to receipt of the charge event by initiating the look up in the translation function 120 using the customer identifier to obtain the mapping between the customer identifier and the at least data partition that includes the source data partition 162. The charge event may be received by the source charging function element 140 from a network element function 130.

In a further embodiment, the event message includes a customer move event indicating that movement of the customer data is to be initiated, and the at least one processing circuit 510 of the source charging function element 140 is further operative to respond to receipt of the customer move event by initiating the look up in the translation function 120 using the customer identifier to obtain the mapping between the customer identifier and the at least data partition that includes the source data partition 162. The event message may be received by the source charging function element 140 from a customer move service 110.

In a further embodiment, the at least one processing circuit 510 of the source charging function element 140 is further operative to, when the customer identifier is determined to be mapped by the translation function 120 to the source data partition 162 and to the target data partition 164, and prior to communicating with the target charging function element 150 to move the customer data from the source data partition 162 to the target data partition 164. The at least one processing circuit 510 then closes pending charge events for ongoing sessions associated with the customer identifier, and handover responsibility for subsequent charging related to the ongoing sessions to the target charging function element 150.

In a further embodiment, the charging system 170 further includes the target charging function element 150. The at least one processing circuit 510 of the source charging function element 140 is further operative to handover the event message to the target charging function element 150. At least one processing circuit 510 of the target charging function element 150 is operative to respond to receipt of the event message by attempting to read part of the customer data from the target data partition 164, and to respond to the read returning a data not found error indication by communicating a handover request message to the source charging function element 140 requesting movement of the customer data from the source data partition 162. The at least one processing circuit 510 of the source charging function element 140 is operative to perform the handover of responsibility for subsequent charging related to the ongoing sessions to the target charging function element 150 based receiving the handover request message and to prevent any further update by the source charging function element 140 of the customer data on the source data partition 162 based on any subsequently received charging event related to the customer identifier.

In a further embodiment, the at least one processing circuit 510 of the source charging function element 140 is further operative to perform the closing of pending charge events for the ongoing sessions associated with the customer identifier by adding charges for the pending charge events to the customer data in the source data partition 162, before communicating with the target charging function element 150 to move the customer data from the source data partition 162 to the target data partition 164.

In a further embodiment, the charging system 170 includes a customer move service 110. At least one processing circuit 510 of the customer move service 110 is operative to respond to receipt of a move request which is directed to the customer identifier by communicating with the translation function 120 to add the target data partition 164 to an existing mapping of the customer identifier to the source data partition 162.

The at least one processing circuit 510 of the customer move service 110 may be further operative to respond to receipt of a notification from the target charging function element 150 that the customer data move from the source data partition 162 to the target data partition 164 has been completed, by communicating with the translation function 120 to delete the source data partition 162 from the mapping to the customer identifier so the remaining mapping by the translation function 120 for the customer identifier is to the target data partition 164.

In a further embodiment, the at least one processing circuit 510 of the source charging function element 140 is further operative to delete the customer data from the source data partition 162 based on an instruction from the customer move service 110 indicating successful completion of the movement of the customer data.

In a further embodiment, the at least one processing circuit 510 of the source charging function element 140 is further operative to, when the customer identifier is determined to be mapped by the translation function 120 to the source data partition 162 and to the target data partition 164, close pending charge events for ongoing sessions associated with the customer identifier by adding charges for the pending charge events to the customer data in the source data partition 162, and upon completion of the closing of the pending charge events communicating the customer data from the source data partition 162 to the target charging function element 150.

In a further embodiment, the charging system 170 may include the target charging function element 150, and at least one processing circuit 510 of the target charging function element 150 is operative to receive the customer data from the source charging function element 140 and to write the customer data to the target data partition 164, and then take responsibility for processing of incoming charge events related to the ongoing sessions associated with the customer identifier.

The at least one processing circuit 510 of the source charging function element 140 may be further operative, while performing the closing of pending charge events for the ongoing sessions associated with the customer identifier, to continue to process any incoming charge events related to the ongoing sessions associated with the customer identifier.

The at least one processing circuit 510 of the target charging function element 150 may be further operative to respond to completion of the writing of the customer data to the target data partition 164, by communicating to a customer move service 110 a notification indicating that the customer data move from the source data partition 162 to the target data partition 164 has been completed.

Figure 5:
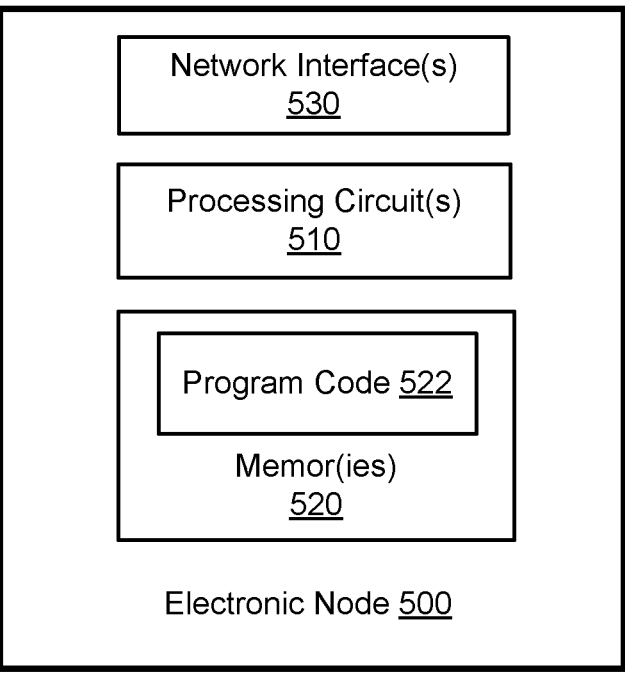
FIG. 5 is a block diagram of an electronic node of the communications system FIGS. 1-4, such as the charging function elements, the customer move service, the translation function, the network element function, and/or the external rebalancing function, containing elements that are configured according to some embodiments of the present disclosure.

FIG. 5 is a block diagram of an electronic node 500 of the communications system FIGS. 1-4, such as the charging function elements, the customer move service, the translation function, the network element function, and/or the external rebalancing function, containing elements that are configured according to some embodiments of the present disclosure.

The electronic node 500 can include one or more network interfaces 530 (referred to as "network interface" for brevity), at least one processor circuit(s) 510 (referred to as "processor" for brevity), and at least one memory circuit(s) 520 (referred to as "memory" for brevity) containing program code 522.

The network interface 530 may be configured to communicate through a wired interface, e.g., Ethernet, and/or wireless interface, e.g., wireless transceiver, according to one or more proprietary protocols and/or industry standardized protocols, e.g., WiFi, 3GPP 4G, 5G (NR), etc. The processor 510 may include one or more data processing circuits, such as a general purpose and/or special purpose processor (e.g., microprocessor and/or digital signal processor) that may be collocated or distributed across one or more networks. The processor 510 is configured to execute program code 522 in the memory 520, described below as a non-transitory computer readable medium, to perform some or all of the operations and methods that are described above for one or more of the embodiments of a charging function elements, a customer move service, a translation function, a network element function, and/or an external rebalancing function, such as regarding one or more of the embodiments described herein in the context of FIGS. 1-4 and 6.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A charging system comprising:

a source charging function element of a communications system, the source charging function element comprising at least one processing circuit operative to:

process charge events for network charging related to a customer identifier to write customer data indicating the network charging into a source data partition of a global storage system;

based on receiving an event message, determine the customer identifier based on content of the event message and perform a look up in a translation function to obtain a mapping between the customer identifier and at least data partition that includes the source data partition; and when the customer identifier is determined to be mapped by the translation function to the source data partition and to a target data partition, communicate with a target charging function element to move the customer data from the source data partition to the target data partition.

2. The charging system of claim 1, wherein the at least one processing circuit of the source charging function element is further operative to:

when the customer identifier is determined to be mapped by the translation function to only the source data partition and not any other data partition, continue processing further charge events related to the customer identifier to write customer data indicating the network charging into the source data partition without communicating with any other charging function element to move the customer data from the source data partition to any other data partition.

3. The charging system of claim 1, wherein the event message comprises a charge event for network charging related to the customer identifier, and the at least one processing circuit of the source charging function element is further operative to:

respond to receipt of the charge event by initiating the look up in the translation function using the customer identifier to obtain the mapping between the customer identifier and the at least data partition that includes the source data partition.

4. The charging system of claim 3, wherein the charge event is received by the source charging function element from a network function element.

5. The charging system of claim 1, wherein the event message comprises a customer move event indicating that movement of the customer data is to be initiated, and the at least one processing circuit of the source charging function element is further operative to:

respond to receipt of the customer move event by initiating the look up in the translation function using the customer identifier to obtain the mapping between the customer identifier and the at least data partition that includes the source data partition.

6. The charging system of claim 5, wherein the event message is received by the source charging function element from a customer move service.

7. The charging system of claim 1, wherein the at least one processing circuit of the source charging function element is further operative to:

when the customer identifier is determined to be mapped by the translation function to the source data partition and to the target data partition, and prior to communicating with the target charging function element to move the customer data from the source data partition to the target data partition, close pending charge events for ongoing sessions associated with the customer identifier, and handover responsibility for subsequent charging related to the ongoing sessions to the target charging function element.

8. The charging system of claim 7, further comprising the target charging function element, wherein:

the at least one processing circuit of the source charging function element is further operative to handover the event message to the target charging function element;

at least one processing circuit of the target charging function element is operative to respond to receipt of the event message by attempting to read part of the customer data from the target data partition, and to respond to the read returning a data not found error indication by communicating a handover request message to the source charging function element requesting movement of the customer data from the source data partition; and the at least one processing circuit of the source charging function element is operative to perform the handover of responsibility for subsequent charging related to the ongoing sessions to the target charging function element based receiving the handover request message and to prevent any further update by the source charging function element of the customer data on the source data partition based on any subsequently received charging event related to the customer identifier.

9. The charging system of claim 7, wherein the at least one processing circuit of the source charging function element is further operative to:

perform the closing of pending charge events for the ongoing sessions associated with the customer identifier by adding charges for the pending charge events to the customer data in the source data partition, before communicating with the target charging function element to move the customer data from the source data partition to the target data partition.

10. The charging system of claim 1, further comprising a customer move service, wherein:

at least one processing circuit of the customer move service is operative to respond to receipt of a move request which is directed to the customer identifier by communicating with the translation function to add the target data partition to an existing mapping of the customer identifier to the source data partition.

11. The charging system of claim 10, wherein the at least one processing circuit of the customer move service is further operative to:

respond to receipt of a notification from the target charging function element that the customer data move from the source data partition to the target data partition has been completed, by communicating with the translation function to delete the source data partition from the mapping to the customer identifier so the remaining mapping by the translation function for the customer identifier is to the target data partition.

12. The charging system of claim 10, wherein the at least one processing circuit of the source charging function element is further operative to delete the customer data from the source data partition based on an instruction from the customer move service indicating successful completion of the movement of the customer data.

13. The charging system of claim 1, wherein the at least one processing circuit of the source charging function element is further operative to:

when the customer identifier is determined to be mapped by the translation function to the source data partition and to the target data partition, close pending charge events for ongoing sessions associated with the customer identifier by adding charges for the pending charge events to the customer data in the source data partition, and upon completion of the closing of the pending charge events communicating the customer data from the source data partition to the target charging function element.

14. The charging system of claim 13, further comprising the target charging function element, wherein:

at least one processing circuit of the target charging function element is operative to receive the customer data from the source charging function element and to write the customer data to the target data partition, and then take responsibility for processing of incoming charge events related to the ongoing sessions associated with the customer identifier.

15. The charging system of claim 14, wherein the at least one processing circuit of the target charging function element is further operative to:

respond to completion of the writing of the customer data to the target data partition, by communicating to a customer move service a notification indicating that the customer data move from the source data partition to the target data partition has been completed.

16. The charging system of claim 13, wherein:

the at least one processing circuit of the source charging function element is further operative, while performing the closing of pending charge events for the ongoing sessions associated with the customer identifier, to continue to process any incoming charge events related to the ongoing sessions associated with the customer identifier.

17. A method by a source charging function element of a communications system, the method comprising:

processing charge events for network charging related to a customer identifier to write customer data indicating the network charging into a source data partition of a global storage system;

based on receiving an event message, performing a look up in a translation function to obtain a mapping between a customer identifier, which is determined based on content of the event message, and at least data partition that includes the source data partition; and when the customer identifier is determined to be mapped by the translation function to the source data partition and to a target data partition, communicating with a target charging function element to move the customer data from the source data partition to the target data partition.

18. The method of claim 17, further comprising:

when the customer identifier is determined to be mapped by the translation function to the source data partition and to the target data partition, and prior to communicating with the target charging function element to move the customer data from the source data partition to the target data partition, closing pending charge events for ongoing sessions associated with the customer identifier and handing over responsibility for subsequent charging related to the ongoing sessions to the target charging function element.

19. The method of claim 17, further comprising:

deleting the customer data from the source data partition based on an instruction from a customer move service indicating successful completion of the movement of the customer data to the target data partition.

20. The method of claim 17, further comprising:

when the customer identifier is determined to be mapped by the translation function to the source data partition and to the target data partition, performing closing pending charge events for ongoing sessions associated with the customer identifier by adding charges for the pending charge events to the customer data in the source data partition, and upon completion of the closing of the pending charge events communicating the customer data from the source data partition to the target charging function element.

*    *    *    *    *